Aug. 23, 1927.
A. E. STRINGER
1,640,057
TESTING COVER SUPPORT AND PIPE THEREFOR
Filed April 21, 1924
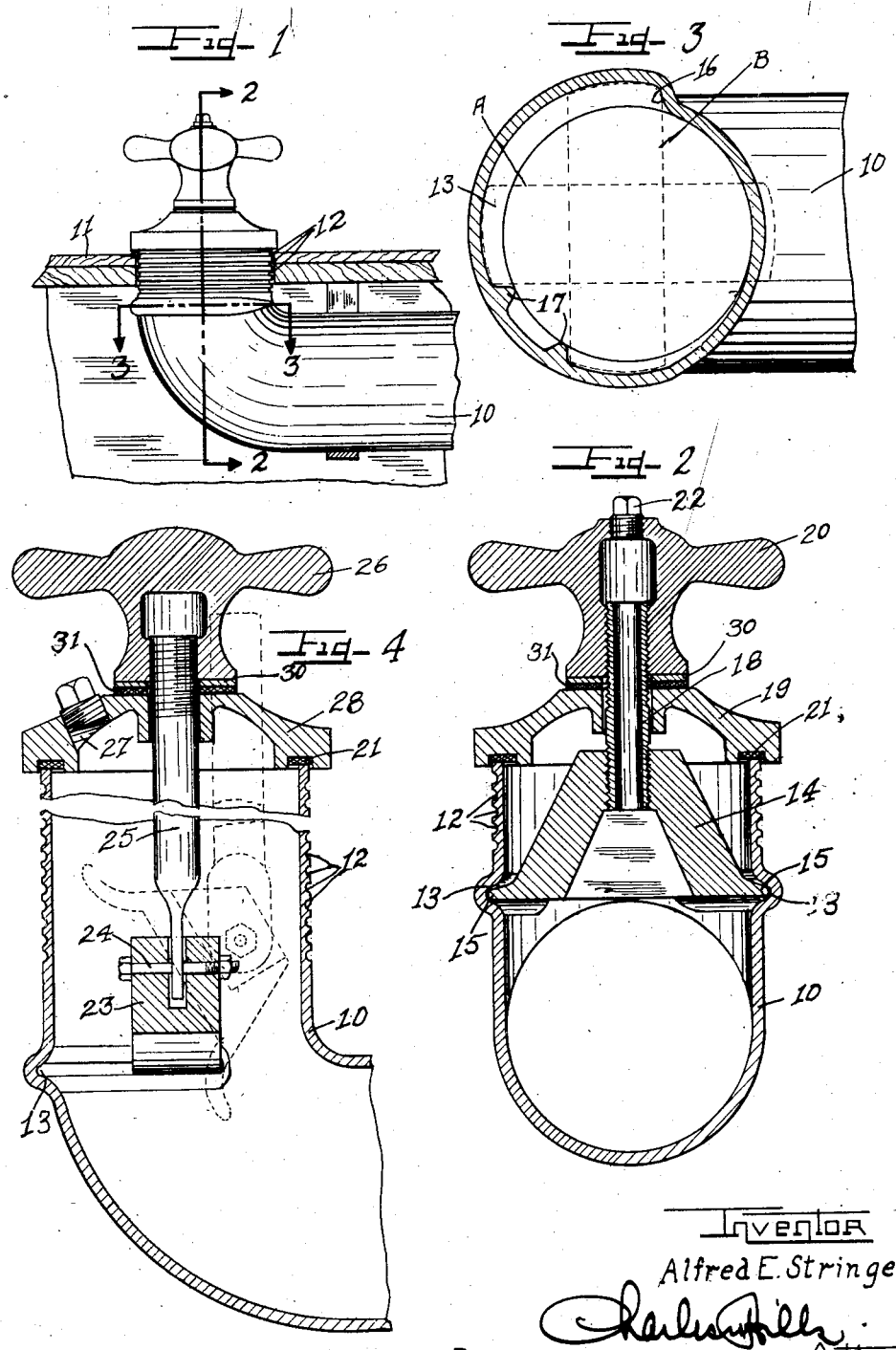
Inventor
Alfred E. Stringer
by Charles Hill
Attys.

Patented Aug. 23, 1927.

1,640,057

UNITED STATES PATENT OFFICE.

ALFRED E. STRINGER, OF CHICAGO, ILLINOIS.

TESTING-COVER SUPPORT AND PIPE THEREFOR.

Application filed April 21, 1924. Serial No. 707,800.

This invention relates to testing covers, supports therefor and pipes to be used in connection therewith. In installing plumbing systems it is customary to test out the pipe system before connecting the bath tubs, wash-bowls and toilet apparatus thereto. For this purpose lugs have been arranged on the interior of the pipe for engagement with a cross bar to provide a support for means for clamping a cover onto the end of the pipe. Such an arrangement has the disadvantage that the lugs on the interior of the pipe catch paper, etc. and tend to clog up the pipe. Furthermore experience has demonstrated that the support is liable to slip down into the pipe where it could not be recovered after detachment from the clamping means.

An object of the present invention is to provide an improved testing cover, support and pipe therefor which will be cheap to construct and simple in operation but still overcome the disadvantages of the prior art devices.

Other and further important objects of the invention will be apparent from the disclosures in the specification and the accompanying drawings.

The invention (in a preferred form) is illustrated in the drawings and hereinafter more fully described.

On the drawings:

Figure 1 is a side elevation of a device constructed in accordance with the present invention.

Figure 2 is a section on the line 2—2 of Figure 1.

Figure 3 is a section on the line 3—3 of Figure 1.

Figure 4 is a vertical section through a modified form of construction.

As shown on the drawings:—

The invention is illustrated in connection with a waste pipe terminating in an elbow although the invention is also applicable to straight ended pipes. In the majority of household installations an elbow 10 is employed, which as shown on the drawings, is usually arranged so that one arm extends slightly above the level of the floor 11. On the outside of the pipe are formed a series of grooves 12 which facilitate the cutting of the pipe in case it should project further above the floor than desired. Adjacent the lower end of the vertical arm of the elbow is arranged a groove 13, the outer walls of the pipe being extended outwardly around such groove so as to retain the same wall thickness throughout.

A member 14 is provided with lateral extensions 15 adapted to engage with the groove 13, as shown in Figure 2. The member is tilted in the direction of the horizontal arm of the elbow so that it may be inserted into the open arm of the latter and dropped until one of the extensions 15 enter the horizontal arm of the elbow. The opposite extension may then be inserted within the groove 13 and the member moved into the horizontal position indicated in dotted lines A in Figure 3. The next operation is to turn the member through approximately 90° so that it assumes the position shown in dotted lines B in Figure 3 and in section in Figure 2. In this latter position the member is firmly anchored to the pipe. To aid in the positioning of this member a shoulder 16 may be formed at one end of the groove 13 and in addition intermediate shoulders or lugs 17 may be arranged in the groove.

The member 14 is centrally apertured and has attached thereto, conveniently by a threaded connection, a rod or tube 18 which extends through an aperture in a cover 19 resting upon the top of the pipe 10.

The upper end of the rod or tube 18 is threaded for engagement with a handle 20 which may be turned to force the cover down upon the pipe 10. The under side of the cover is recessed for the reception of a gasket 21 of rubber or other suitable material. A metal washer 30 and a rubber gasket 31 are arranged between the handle 20 and the cover 19.

The aperture in the handle 20 which is threaded to receive the member 18 is conveniently continued entirely through the handle so that it may serve as a conduit for the water employed for testing purposes. The upper end of this aperture is, therefore, threaded for the reception of either a threaded plug 22 or a pipe (not shown) connected to a suitable head of water. Of course it is obvious that in testing the line it will not be necessary to fill through each of the members 18 and if desired a suitable bolt or threaded rod may be used in lieu of the tube in some of the devices embodying my invention.

In Figure 4 is shown an alternative form of construction. In this case the member 23, which corresponds to the member 14 of Figures 1 to 3, is pivotally connected by a bolt 24 to the pipe 25 with which the handle 26 is connected. This construction is particularly suited for elbows having a long vertical arm.

As shown the handle 26 is only recessed and not apertured so that a threaded aperture 27 is provided in the cover 28 for the reception of either a threaded plug 29 or a pipe (not shown) connected to a suitable head of water.

In other respects the construction and operation of the form shown in Figure 4 is similar to that shown in Figures 1 to 3.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination of an elbow having a groove extending partially around the inner end of its open arm adjacent the bend of the elbow, a cap adapted to seat on the open arm of the elbow, a cross-piece adapted to be inserted into such open arm of the elbow with one end of the cross-piece extending into the other arm of the elbow and the other end thereof within the central portion of the groove, said cross piece being adapted to be brought into operative engagement with said groove by a rotary movement, stop shoulders in said groove for limiting the rotary movements of said cross-piece therein, and clamping means acting on said cross-piece for forcing said cap against the end of the elbow.

2. The combination of an elbow having an internal groove extending partially around the inner end of one arm thereof and adjacent to the bend of the elbow, a cross piece formed for insertion in the first instance parallel to the longitudinal axis of the elbow with one end thereof extending into the other arm of the elbow and the other end extending into the central portion of the groove, said cross piece being thereafter rotatable until both of its ends are within the groove, a cap for closing the open arm of the elbow, a stem in connection at its lower end with the central portion of the cross piece and rising centrally through the cap, and a handle threaded upon the upper end of the stem whereby to clamp the cap in closed position.

3. The combination of an elbow having an internal groove extending partially around the inner end of one arm thereof and adjacent to the bend of the elbow, a cross piece formed for insertion in the first instance parallel to the longitudinal axis of the elbow with one end thereof extending into the other arm of the elbow and the other end extending into the central portion of the groove, said cross piece being thereafter rotatable until both of its ends are within the groove, a cap for closing the open arm of the elbow, a stem in connection at its lower end with the central portion of the cross piece and rising centrally through the cap, and a handle threaded upon the upper end of the stem whereby to clamp the cap in closed position, said stem being hollow throughout and said handle having an aperture therethrough which the upper end of the stem enters, and a plug normally closing the outer end of the aperture of the handle as described.

In testimony whereof I have hereunto subscribed my name.

ALFRED E. STRINGER.